United States Patent [19]

Fan et al.

[11] Patent Number: 4,840,747

[45] Date of Patent: Jun. 20, 1989

[54] METHOD FOR PRODUCING A TERBIUM ACTIVATED CERIUM MAGNESIUM ALUMINATE PHOSPHOR

[75] Inventors: Albert K. Fan; Douglas R. Ginter; Joseph J. Lenox; Thomas L. Henson, all of Towanda, Pa.

[73] Assignee: GTE Products Corporation, Stamford, Conn.

[21] Appl. No.: 275,485

[22] Filed: Nov. 23, 1988

[51] Int. Cl.$^4$ ............................................. C09K 11/80
[52] U.S. Cl. ............................................. 252/301.4 R
[58] Field of Search ................................. 252/301.4 R

[56] References Cited

U.S. PATENT DOCUMENTS

| | | | |
|---|---|---|---|
| 4,088,922 | 5/1978 | Wolfe | 252/301.4 R |
| 4,150,321 | 4/1979 | Schetters et al. | 252/301.4 R |
| 4,153,572 | 5/1979 | Wolfe | 252/301.4 R |
| 4,631,144 | 12/1986 | Beers et al. | 252/301.4 R |

FOREIGN PATENT DOCUMENTS 226899  9/1985  Fed. Rep. of Germany ... 252/301.4 R

*Primary Examiner*—Jack Cooper
*Attorney, Agent, or Firm*—Donald R. Castle

[57] ABSTRACT

A method is disclosed for producing a terbium activated cerium magnesium aluminate phosphor which comprises forming a uniform powder blend consisting essentially of in percent by weight from about 73 to about 74 aluminum oxide wherein the aluminum oxide can be alpha aluminum oxide or gamma aluminum oxide or combinations thereof, from about 12 to about 14 cerium oxide, from about 2 to about 3 magnesium, from about 0.3 to about 0.7 fluoride, and from about 6 to about 9 terbium, firing the blend in a non-oxidizing atmosphere at a temperature of from about 1500° C. to about 1800° C. for a sufficient time to produce the phosphor wherein the particle size is no greater than about 5 micrometers in diameter. The phosphor is then cooled and deagglomerated.

1 Claim, No Drawings

METHOD FOR PRODUCING A TERBIUM ACTIVATED CERIUM MAGNESIUM ALUMINATE PHOSPHOR

This invention relates to a method for producing a terbium activated cerium magnesium aluminate phosphor in which the amount of terbium is reduced from what has been normally used and in which a smaller particle size is achieved in the phosphor. The smaller particle size allows for less phosphor to be used in coating of fluorescent lamps.

BACKGROUND OF THE INVENTION

In the manufacture of fluorescent lamps, the amount of phosphor required to coat a given size lamp depends greatly on the particle size of the phosphor that is being used. In general, the smaller the particle size the less amount of phosphor that is required to give a uniform coating and generate the greatest amount of light output which results in cost saving in lamp manufacture. In addition, modern fluorescent lamp manufacture uses multiple layer coating technology with less expensive halophosphate phosphor as a base layer, then overcoat with a skin layer of high lumen, high color rendition rare earth containing phosphor. There is a significant advantage in that this skin layer of rare earth phosphor is of small particle size which not only gives uniform coating without pin holes but also cold coat thinner than regular large particle size phosphor. This results in both a reduced lamp manufacture cost and high lamp brightness with better color rendition.

SUMMARY OF THE INVENTION

In accordance with one aspect of the invention, there is provided a method for producing a terbium activated cerium magnesium aluminate phosphor which comprises forming a uniform powder blend consisting essentially of in percent by weight from about 73 to about 74 aluminum oxide wherein the aluminum oxide can be alpha aluminum oxide or gamma aluminum oxide or combinations thereof, from about 12 to about 14 cerium oxide, from about 2 to about 3 magnesium, from about 0.3 to about 0.7 fluoride, and from about 6 to about 9 terbium, firing the blend in a non-oxidizing atmosphere at a temperature of from about 1500° C. to about 1800° C. for a sufficient time to produce the phosphor wherein the particle size is no greater than about 5 micrometers in diameter. The phosphor is then cooled and deagglomerated.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The present invention provides a method for producing a terbium activate cerium magnesium aluminate phosphor in which the particle size is no greater than about 5 micrometers in diameter. The particle size is about half the particle size of the previous phosphor. The smaller particle size which is due to the use of alpha or gamma aluminum oxide and the reduced amount of fluoride, allows for effective coating in a fluorescent lamp with less phosphor than had to be used previous to the present invention. Typically there is about a 60% reduction in the amount of powder that is used in lamps than in the prior method.

A relatively uniform dry blend is first formed of the components from which the phosphor is to be formed. The composition of the blend is as follows in percent by weight: from about 73 to about 74 aluminum oxide, from about 12 to about 14 cerium oxide, from about 2 to about 3 magnesium, from about 0.3 to about 0.7 fluoride, and from about 6 to about 9 terbium. This composition in particular allows for use of a reduced amount of expensive terbium (typically about a 25% by weight reduction) than is used in prior methods. Most typically the amount of terbium is less than about 9% by weight. The most preferred terbium concentration is about 7% by weight.

The aluminum oxide can be either alpha or gamma aluminum oxide or combinations thereof. Use of alpha or gamma aluminum oxide allows for less terbium to be used than with aluminum hydroxide in the prior methods in which greater than about 9% by weight of terbium was generally needed. Use of alpha or gamma aluminum oxide over the prior method of using aluminum hydroxide and a reduced amount of fluoride allows for a smaller particle size phosphor to be produced. When aluminum hydroxide is used, the particle size of the resulting phosphor is above about 10 micrometer range as measured by Coulter Counter.

The source of magnesium is most typically magnesium oxide. Magnesium fluoride and other magnesium containing compounds can be used also. Mixtures of magnesium oxide and magnesium fluoride and magnesium containing compounds can be used as long as the fluoride is not in excess of the required amount.

The source of fluoride is most typically magnesium fluoride. The source of terbium is most typically terbium oxide. Terbium fluoride can be used also. Mixtures of terbium oxide and terbium fluoride can be used as long as the fluoride is not in excess of the required amount.

The components are blended by known dry blending techniques. to obtain a uniform mixture.

The blend is then fired in a reducing atmosphere preferably $H_2$—$N_2$ with about 75% by volume hydrogen and the balance nitrogen at a temperature of from about 1500° C. to about 1800° C. and preferably from about 1600° C. to about 1700° C. for a sufficient time to produce the phosphor. The firing time depends on factors such as temperature and the size of the charge.

The resulting phosphor is then cooled and then deagglomerated. One method is to use a vibratory mill such as manufactured by SWECO.

The phosphor can then be classified to remove foreign material.

To more fully illustrate this invention, the folowing nonlimiting examples are presented.

EXAMPLE 1

A mixture of about 280.29 g of alpha or gamma aluminum oxide, about 30.26 g of $Tb_4O_7$ (assay 99.05%), 51.66 g $CeO_2$ (assay 99.95%), 15.62 g MgO (assay 98.06%) and 4.83 g $MgF_2$ (assay 90.22%) is weighed and premixed in a plastic bag. The mixture is then loaded into a one gallon plastic bottle with 535 g of ½" cylindrical alumina stone and mixed for about 30 minutes in a paint shaker. After the stone is separated, the raw material is then loaded into two 4"×4"×2½" alumina trays and fired in a hydrogen furnace at about 1650° C. for about 8 hours. The firing atmosphere consists of about 75% by volume hydrogen and and the balance nitrogen mixed gas. The fired phosphor cakes are cooled and then hand crushed and loaded into a one gallon polyurethane lined metal canister which contains about 2.3 kg of ¼" cylindrical alumina milling media. The canister is placed in a SWECO mill and milled for about 30 minutes to break apart the agglomerate particles. The phosphor powder is then separated from the alumina media and screened through 400 mesh stainless steel screen in a sand shaker. The phosphor which is obtained is of better quality than normal production type phosphor. It has low terbium and a smaller particle size of no greater than about 5 micrometers in diameter. When manufactured into a 40 watt 4 foot fluorescent lamp, the results as shown in Table 1 clearly demonstrate that the novel invention phosphors are superior to phosphors prior to the present invention.

TABLE 1

|  | wt. % Tb | Coulter size | Coating Wt (g) | 100 hr Lumens | Lumens/ Watt | % M |
|---|---|---|---|---|---|---|
| Phosphor prior to the present invention using aluminum hydroxide | 9 | 11 | 6.2 | 4,672 | 115.4 | 95.8 |
| Phosphor of this invention using alpha aluminum oxide | 7 | 4.6 | 3.9 | 4,646 | 115.6 | 96.7 |
| Phosphor of this invention using gamma aluminum oxide | 7 | 5.0 | 3.9 | 4,621 | 115.2 | 97.2 |

% M — % Maintenance $\frac{\text{Lumens at 100 hr.}}{\text{Lumens at 0 hr.}} \times 100$ The results show that brightness is not sacrificed, but the amount of terbium is lower and the amount of powder that is used is less than in the prior methods (Coating wt).

EXAMPLE 2

To a 41 gallon drum is added:

|  |  | ASSAY |
|---|---|---|
| $Al_2O_3$ | 14.020 kg | 100.00 |
| $CeO_2$ | 2.583 kg | 99.97 |
| MgO | 0.845 kg | 92.06 |
| $MgF_2$ | 0.119 kg | 92.06 |
| $Tb_4O_7$ | 1.512 kg | 98.88 |

The mixture is drum blended for about ½ hour and milled in a SWECO mill for about ½ hour and then drum blended for about ½ hour. The resulting blend is fired in a $H_2$ furnace at about 1650° C. for about 7.9 hours using a $H_2$—$N_2$ atmosphere (about 75% by volume $H_2$). The resulting fired phosphor cake is then hand rolled and screened through a 64 mesh screen. The screened phosphor is then drum blended and then SWECO milled in pot mills using about 2.3 kg of ¼" cylindrical grinding media and about 459 g of phosphor for about ½ hour. The resulting milled phosphor is then slurried in deionized water using a 50 gallon glass lined tank. The slurry is then SWECO sifted through a 378 mesh screen onto a fiter crock. The filtered phosphor is then oven dried overnight at about 250° F. The oven dried material is then drum blended to insure uniformity. Lamp data on the phosphor in a 40 watt 4 ft. fluorescent lamp is given in Table 2 below.

TABLE 2

|  | wt. % Tb | Coating Wt. (g) | 100 hr Lumens | Lumens/ Watt | % M |
|---|---|---|---|---|---|
| Phosphor prior to the present invention using aluminum hydroxide | 9 | 6.23 | 4,710 | 119.5 | 96.7 |
| Phosphor of this invention using alpha aluminum oxide | 7 | 3.96 | 4,588 | 114.7 | 93.5 |

The results show again that brightness is not sacrificed, but the amount of terbium is lower and the amount of powder that is used is less than in the prior methods (Coating wt).

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for producing a terbium activated cerium magnesium aluminate phosphor, said method comprising:
   (a) forming a uniform powder blend consisting essentially of in percent by weight from about 73 to about 74 aluminum oxide, wherein said aluminum oxide is selected from the group consisting of alpha aluminum oxide, gamma aluminum oxide, and combinations thereof, from about 12 to about 14 cerium oxide, a source of magnesium in an amount of from about 2 to about 3 magnesium, a source of fluoride in an amount of from about 0.3 to about 0.7 fluoride, and a source of terbium in an amount of from about 6 to about 9 terbium;
   (b) firing said blend in a non-oxidizing atmosphere at a temperature of from about 1500° C. to about 1800° C. for a sufficient time to produce the phosphor wherein the particle size is no greater than about 5 micrometers in diameter;
   (c) cooling said phosphor; and
   (d) deaggmomerating the resulting cooled phosphor.

* * * * *